United States Patent Office
3,027,854
Patented Apr. 3, 1962

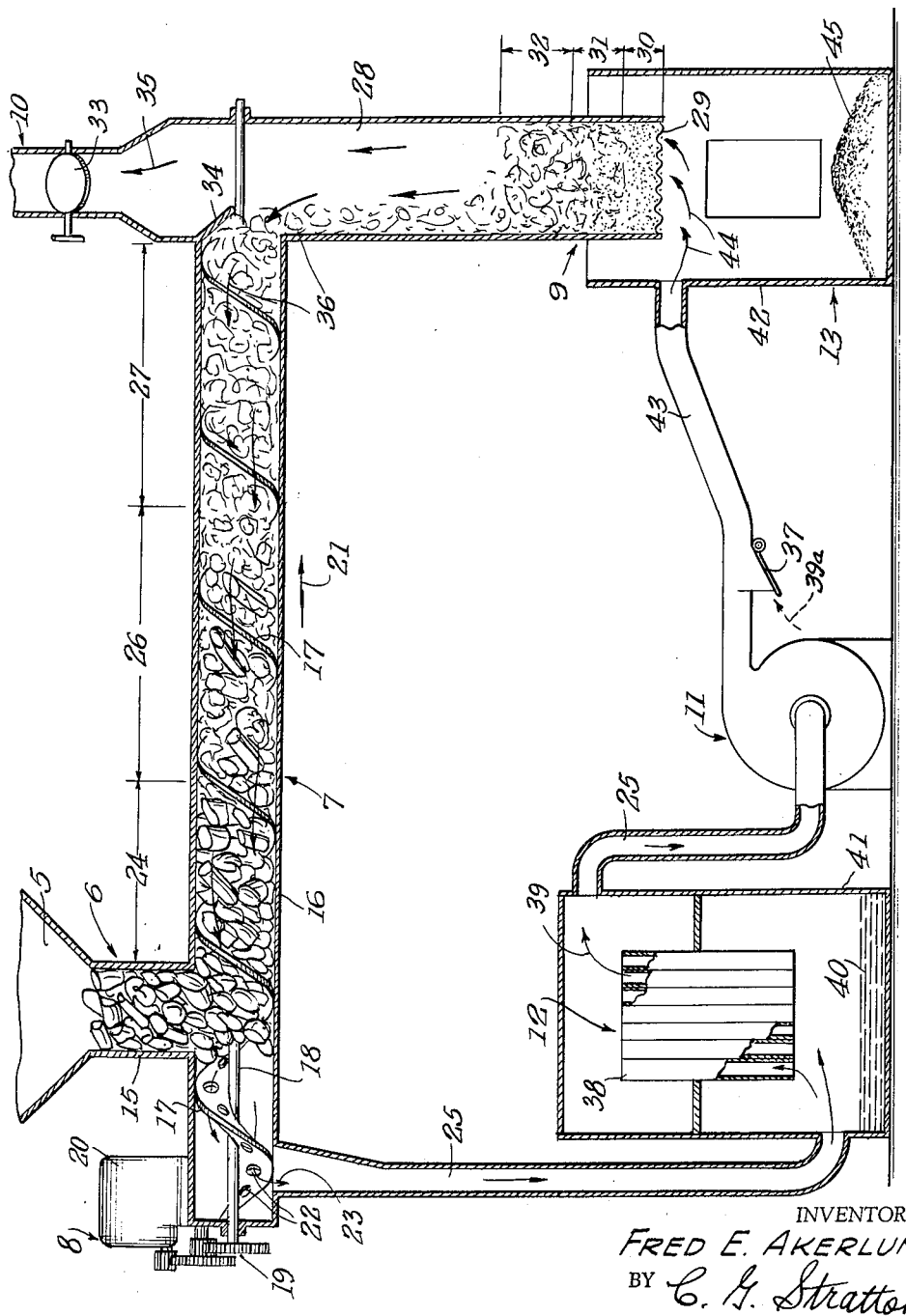

3,027,854
APPARATUS AND PROCESS FOR THERMAL
DESTRUCTION OF WASTE MATERIALS
Fred E. Akerlund, 1793 Valley Park Ave.,
Hermosa Beach, Calif.
Filed Nov. 14, 1957, Ser. No. 696,523
1 Claim. (Cl. 110—15)

This invention relates to a process for the thermal destruction of waste materials, such as household and industrial waste, and to an apparatus for carrying out said process.

An object of the present invention is to provide a process that is continuous and which destroys waste materials without the additional application of heat other than the heat generated by the self-destruction of said materials.

Another object of the invention is to provide a process of the character above indicated, in which the heat generated at a reaction or heating zone is moved as a flow of heated gases in a direction counter to the direction of movement of the waste material being treated to, first, drive off any moisture in said material, then destructively distillate the same, and finally, carbonize the same without, however, effecting complete consumption.

A still further object of the invention is to provide a method in which carbonized waste material constitutes a fuel that is used in a reaction zone to create the heat needed for drying and distilling the material, as above.

A still further object of the invention is to cause a recirculation of non-condensable gases driven off from the waste material while the same is being dried, and the movement of said non-condensing portions of said gases, together with an admixture of air, to the carbonization reaction zone to cause reduction of the material to an ash and innocuous gases that may be removed, as by a stack.

A further object of the invention is to provide apparatus for the purpose of carrying out the herein-described process.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes a preferred embodiment of the present invention, which is given by way of illustration or example only.

In the drawing, like reference characters designate similar parts in the several views.

The FIGURE is a semi-schematic sectional view of apparatus according to the present invention, the same being devised for carrying out the process of this invention.

The apparatus of the present invention comprises, generally, a hopper 5 that opens onto a refuse plug 6, refuse stoking means 7 receiving material from the plug 6, a drive 8 to operate the means 7, a combustion area 9 that receives material fed thereto by the stoking means 7, a stack receptive of excessive heat and carbon dioxide and other innocuous gases given off in the combustion area 9, a fan or blower 11 that draws the gases through the material in the stoking means 7, in a direction counter to the feed of refuse in the stoking means 7, a condenser 12 through which said gases are drawn by the blower 11 and which condenses some of said gases and passes others to the blower, and an ash pit 13 that receives ashes, the solid product of combustion created at the area 9.

The particular form of the hopper 5 is immaterial, providing the same is capable of receiving waste material and directing the same to the refuse plug 6 in a manner to constitute a mass that retards flow of air or other gases therethrough.

Said plug 6 is contained in a tube 15 that extends from the hopper 5.

The stoking means 7 is shown as a horizontal housing tube 16, the same being connected to tube 15 to receive refuse therefrom. A feed screw or helix 17 is disposed with the tube 16, the same being mounted on a drive shaft 18. The latter is driven, as by reduction gearing 19, by the prime mover 8 which is here shown as an electric motor 20 that drives the gearing 19 at a relatively low rate of speed. The helix 17 is driven in a direction to cause feed of refuse in the direction of the arrow 21.

It will be understood that the helix may be loosely fitted in the housing tube 16 or the same may be provided with holes 22 so as to enable flow of gases in the direction of arrows 23, the direction being counter to that of the feed or movement of refuse.

As will be clear hereinafter, the gases moving according to arrows 23 are heated and the same cause drying of the refuse in the housing tube 16 at a zone designated 24 and constituting a drying zone in which said gases drive off moisture from the refuse. The moisture-laden gases are directed into a conduit 25 that extends from the tube 16 beyond where said tube receives refuse.

Beyond the drying zone 24 the housing 16 continues as a destructive distillation zone 26, wherein the garbage material is reduced to a thoroughly dried state quite ready to be carbonized. The next zone 27 is the carbonization zone wherein the destructively distilled material, without being otherwise consumed, is reduced to a carbonized form that is capable of further reduction in the presence, particularly, of oxygen.

The carbonized material from zone 27 is displaced by the helix into a vertical chamber 28, the lower end of which is provided with a perforate grate 29. During the normal operation of the present apparatus, the grate supports an ash layer 30, the latter supports partly reduced material in a reaction zone 31, and the material in the zone 31 forms the bottom and supports the carbonized material displaced from zone 27. The carbonized fuel thus provided occupies a zone 32 above the zone 31.

The housing of the chamber 28 continues upwardly as the stack 10 above the point where the refuse material is being discharged by the helix. The stack 10 may be provided with a control damper 33 to limit the proportion of exhaust gases from the zones 30, 31 and 32, that may pass upwardly through the stack, and a baffle 34 may be provided to guide part of those gases into the housing 16 to be drawn through said housing, according to the arrows 23, by the blower 11. The arrow 35 shows the path of exhaust or excessive heat and the gaseous products of combustion of the area 9. The latter ordinarily comprise carbon dioxide and such other innocuous gases as are safe to be dissipated through a stack. The arrows 36 represent the flow of heated gases counter to the movement of the material as represented by the arrow 21. It will be realized that the arrows 36 continue through the waste materials to process them as will later be described, the same exiting from the housing 16, as shown by the arrows 23, into the conduit 25.

The blower or fan 11 may be of any conventional design and, in the present instance, the same may be supplemented by an air valve 37 by means of which the gases moved by the blower may be admixed with atmospheric air, as can be readily understood.

The condenser 12 is interposed in the conduit 25 and is here shown as a condenser unit 38 that receives the gases flowing through said conduit, and creates a suitable heat exchange or other method for condensing condensable gases and allowing non-condensable gases to exit therefrom, as indicated by the arrow 39. The condensed gases, regardless of their form, may be recovered if the same is desired. In this case, the liquid 40 represents such condensed gases, the same being collected in a housing 41 in which the condenser 38 is disposed.

The ash pit 13 comprises a housing 42 that may be open at the top and into the upper portion of which the combustion area 9 is disposed. The fan 11 is connected to said housing 42 as by a conduit 43 that directs the gases propelled by the fan, according to the arrows 44, to be moved toward and upwardly through the grate 29. The lower part of the housing 42 constitutes an ash pit, as represented by the heap of ashes 45.

The present process is a continuous one in which refuse is fed thereinto, then moved slowly but steadily through a flow of hot gases so that refuse is successively dried, distilled, carbonized and heated well beyond the ignition point of said material. This super-heated carbonized residue or fuel is then fed into the final destruction area 9, where it is completely consumed in the presence of a blast of gases in which oxygen, in the form of air, is introduced. Such a blast comprises the non-condensed gases flowing from the condenser 12 (arrow 39), and oxygen (the atmospheric air introduced according to arrow 39a through the valve 37). This flow of mixed gases and combustion air is represented by arrows 44. The volatile materials resulting from such combustion are driven off upwardly from the area 9 during this cracking and distillation and, together with the distillate from the material when initially dried, are passed or moved to the condenser. The condensable gases may be saved and recovered, as hereinbefore indicated, or returned to the final combustion area and burned.

Practice has demonstrated that a temperature of about 3000° F. is generally present in the area 9; that the gases passing through the carbonization zone 27 are at a temperature in the nature of 1000° F.; that the gases passing through the destructive distillation zone 26 are somewhat reduced, being about 500° F.; and that the temperature of the gases in the drying zone 24 may be as low as 100° F. and may reach 250° F., depending on the type of refuse material that is being treated. Of course, the temperatures hereinabove given are exemplary and will vary with conditions, particularly with respect to the type of material fed to the apparatus.

The present process utilizes much of the waste heat which makes it practical to destroy garbage or wet materials. By carbonization of all of the refuse, the same is reduced by as much 75% to 80% by weight before it reaches the final combustion area at 9. Smoke control becomes secondary because of the carbonizing of all of the refuse. The problem of final destruction becomes one only of burning carbonized or charred material, a material that is netither gaseous nor smoke-producing.

The stack 10 is necessary primarily to dispose of the excessive heat that is produced at the area 9, the carbon dioxide gases mainly resulting from said heat, and such other non-noxious gases as may be produced in that area in small quantities. At the reaction zone 31, in which the carbonized material burns, the mentioned high heat is created and the same is of such intensity that the destruction of thin metal objects, such as cans and wire, is readily effected.

Because of the continuity of operation of the present process, the same is capable of handling relatively large amounts of refuse over a given period of time. A pilot plant was constructed according to the apparatus illustrated. The same had a capacity of 500 pounds of mixed refuse per hour. From this plant the above-enumerated details of information were gleaned. Said plant demonstrated conclusively that the capacity thereof was some four to six times as great as the capacity of a plant of the same size that operates on batching of the refuse rather than on the basis of continuous feed.

While the foregoing specification illustrates and describes what I now contemplate to be the best mode of carrying out my invention, the construction is, of course, subject to modification without departing from the spirit and scope of my invention. Therefore, I do not desire to restrict the invention to the particular form of construction illustrated and described, but desire to cover all modifications that may fall within the scope of the appended claim.

Having thus described the invention, what is claimed and desired to be secured by Letters Patent is:

Apparatus for the thermal destruction of waste materials comprising, in combination, a combustion chamber having an upper end, a conveyer having a discharge at the upper end of the combustion chamber and having an opposite end, a blower having an outlet below the combustion chamber and in communication with the lower end thereof and an inlet in communication with said opposite end of the conveyer, the conveyer having a waste-material inlet intermediate the discharge and the opposite end of the conveyer, said conveyer comprising a hollow cylinder in which is mounted a rotating helix having holes for passing hot products of combustion in a direction opposite to the path of movement of waste material.

References Cited in the file of this patent
UNITED STATES PATENTS

| | | |
|---|---|---|
| 572,258 | Hogan | Dec. 1, 1896 |
| 652,670 | Duryee | June 26, 1900 |
| 847,676 | MacKethan | Mar. 19, 1907 |
| 1,491,894 | Atkinson | Apr. 29, 1924 |
| 2,043,459 | Windecker | June 9, 1936 |
| 2,045,115 | Allen et al. | June 23, 1936 |
| 2,116,573 | Harrington | May 10, 1938 |
| 2,184,248 | Bonotto | Dec. 19, 1939 |
| 2,274,780 | Duerr et al. | Mar. 3, 1942 |
| 2,577,659 | Knipping | Dec. 4, 1951 |
| 2,677,235 | Secord | May 4, 1954 |